Patented Aug. 31, 1948

2,448,047

UNITED STATES PATENT OFFICE 2,448,047

PREPARATION OF UNSATURATED ALCOHOLS

William Jennings Peppel, Lodi, N. J., assignor to Burton T. Bush, Inc., New York, N. Y., a corporation of New Jersey No Drawing. Application February 15, 1947, Serial No. 728,953

5 Claims. (Cl. 260—618)

This invention relates to the production of alpha, beta-unsaturated alcohols, and more particularly, to the preparation of such alcohols from the corresponding unsaturated aldehydes by the selective hydrogenation of the latter in the presence of supported reduced cobalt catalyst at elevated temperatures under superatmospheric pressures.

It is well known that in the catalytic hydrogenation of aliphatic, cycloaliphatic and aliphatic side-chain aromatic compounds having both carbon to carbon double bonds and carbonyl groups, addition of hydrogen occurs more readily at the carbon to carbon bond when certain catalysts, for example, nickel, are employed. If the hydrogenation is carried out in such a manner as to avoid appreciable subsequent addition of hydrogen to the carbonyl group, the saturated carbonyl compound may be obtained.

The present invention is directed to an uncommon process in which, instead of the carbon to carbon double bond being first broken to take up hydrogen, hydrogenation of the carbonyl group in the starting aldehyde occurs and the corresponding unsaturated carbinol is produced. In other words, this invention involves a process which will result in satisfactory yields of unsaturated alcohols from corresponding alpha, beta-unsaturated aldehydes.

I am aware that I am not the first to have succeeded in accomplishing the selective hydrogenation of unsaturated aldehydes to unsaturated alcohols. Adams and Garvey, J. A. C. S., 48, 477 (1926) and Adams and Bray, 49, 2101 (1927) have reported such a reaction through the use of platinum oxide catalyst. This process is open to the serious objection, from the practical, industrial standpoint, that it involves a very expensive catalyst. Moreover, Adams et als' process involves the use of ferric chloride and zinc acetate as promoters in concentrations which must be carefully controlled in order to avoid adverse effects.

It is true that catalysts of a non-noble nature have been disclosed as satisfactory for the purpose of selectively hydrogenating unsaturated aldehydes to corresponding unsaturated alcohols. Schmidt, Huttner and Kaeb in U. S. Patent 2,009,948 disclose the use of such catalysts as copper, zinc and cadmium. These inventors, however, expressly state that cobalt catalysts are to be avoided in their process, unless they are poisoned or partially inactivated with, for example, sulfurized quinoline. Accordingly, it was very surprising to find that when reduced cobalt catalysts, suitably supported, were employed, the desired hydrogenation of alpha, beta-unsaturated aldehydes occurred.

In general, in the practice of my process, the material to be hydrogenated and, if desired, a solvent are charged in an autoclave, along with the supported, reduced cobalt catalyst. Hydrogen gas is introduced and the temperature and pressure are raised to the desired points. When a predetermined amount of hydrogen has been absorbed the operation is interrupted by stopping agitation. The autoclave is allowed to cool to about 25° C. and the pressure is released. Then the contents are filtered to separate the catalyst and the solvent, if any, is removed by distillation. The unsaturated alcohol is obtained by first removing aldehydes present by suitable means, as, for example, by reaction with sodium bisulfite and then distilling, in order to separate the unsaturated alcohol from any saturated alcohol which may be present.

My process apparently is somewhat specific in nature and does not yield satisfactory results with unsaturated aldehydes generally. I have found that satisfactory results are obtained with citral, cinnamic aldehyde and para-isopropyl alpha-methyl cinnamic aldehyde. In place of cital, lemongrass oil may be employed as the aldehyde-containing material.

As already noted, solvents may be employed if desired. Examples of solvents which may be used are methyl alcohol, ethyl alcohol, ethyl acetate, isopropyl alcohol, toluene, cyclohexane.

The catalysts which are useful in my process are those which I describe as supported, reduced cobalt catalysts. By this term I refer to catalysts prepared by reducing a compound of cobalt, such as cobaltous oxide or carbonate, which has been precipitated on the supporting substance, with hydrogen gas at an elevated temperature, for example, within the range of about 350° C. to about 450° C. I have found that such treatment for one to two hours is sufficient for the purposes of this application. Kieselguhr is to be preferred as a support for the cobalt because of its satisfactory properties but other inert solid materials such as pumice or china clay to which the cobalt metal will adhere may be employed. Supported catalysts having a low ratio of cobalt to support are characterized by low activity and it is preferable to employ a supported catalyst containing about 10% to 20% of cobalt.

The conditions under which my process is conducted may be varied within limits. Temperatures between about 90° C. and about 160° C. may be employed, though temperatures between about 115° C. and about 140° C. are preferred. Pressures above 20 pounds per square inch give satisfactory results, those between about 200 and 1000 pounds per square inch being advantageous in providing a satisfactory rate of hydrogenation.

In order more fully to clarify this invention, the following specific examples are given by way of illustration.

Example I

A supported cobalt catalyst was prepared as follows: 96 grams of cobaltous nitrate hexahydrate, 150 ml. of distilled water, 60 grams of kieselguhr were mixed together. The resulting paste was ground in a mortar until it flowed freely from a spoon. It was then added slowly portionwise to a mechanically-stirred solution of 40 grams of ammonium carbonate in 350 ml. of distilled water. The mixture was filtered, washed with 300 ml. of water and the solid was dried at 105° C. for sixteen hours. About 15 grams of the cobalt carbonate-kieselguhr powder were placed in a nickel boat and reduced in a stream of hydrogen in an electric furnace held at 450° C. for hour. The reduced catalyst (10–11 grams) was transferred to a glass bottle and 50 cc. of methyl alcohol were added to cover the catalyst.

266 grams (2 mols) of cinnamic aldehyde and 200 cc. of methyl alcohol were charged in an autoclave having a stainless steel liner. The cobalt-on-kieselguhr catalyst, in alcohol, prepared as above, was also introduced into the autoclave. The temperature was quickly raised and then maintained at 125° to 140° C. and hydrogen gas was added until a pressure of 600 pounds per square inch had been attained. As the reaction proceeded the hydrogen pressure went down, as a result of its absorption in the reaction. When it had reached 100 pounds per square inch the operation was interrupted, by stopping agitation of the autoclave and permitting the contents of the autoclave to cool. As is understood in the art, previous calculations involving the volume occupied by the gas in the autoclave and the molecular weight of hydrogen gas had shown that when the pressure dropped from 600 to 100 pounds per square inch an amount of hydrogen gas approximately equal to 2.5 gram-mols would be absorbed in the reaction.

The reaction contents were filtered, in order to separate the catalyst. The methyl alcohol was removed from the filtrate by distillation under atmospheric pressure. The residue was then agitated with a solution of 126 grams of sodium sulfite and 85 grams of sodium bicarbonate in 600 cc. of water for four to five hours. The upper layer of the two layers present was separated from the aqueous lower layer in a separatory funnel, washed twice with 200 cc. of distilled water and then distilled.

The bulk of the distillate boiled over a range of 94° to 115° C. at a pressure of 2 mm. of mercury and had a congealing point of 14° C. Fractionation of the distillate resulted in two fractions: one distilling over a range of 94° to 105° C./2 mm. and the other (161 grams) distilling over a range of 105° to 115° C./2 mm., consisting of cinnamic alcohol with a congealing point of 27° C.

Example II 268 grams of the mixture of products obtained by hydrogenating cinnamic aldehyde as in Example I were filtered, mixed with 350 ml. of toluene and 130 grams of powdered, anhydrous calcium chloride, and the mixture was agitated for twelve hours. The solid present was filtered and washed with 100 ml. of toluene. The washed solid was then treated with water, whereupon it decomposed and an oil layer developed. The oil was collected and distilled. The fraction (185 grams) boiling within the range of 105° to 115° C. and congealing at 23° to 24° C. was cinnamic alcohol.

Example III

A charge consisting of 532 grams of freshly distilled cinnamic aldehyde and 10 grams of freshly prepared (see Example I) cobalt-on-kieselguhr catalyst (15% cobalt content) was hydrogenated at 140° C. to 160° C. and an initial pressure of about 1000 pounds per square inch until about 4 gram-mols of hydrogen gas had been absorbed. The mixture was filtered from the catalyst and agitated with an aqueous solution of 2 gram-mols of sodium sulfite and 2 gram-mols of sodium bicarbonate. The upper layer was separated and distilled. 280 grams of cinnamic alcohol, having a melting point of 29° C., were obtained.

Example IV

A charge consisting of 266 grams of 90% citral, 250 cc. of methyl alcohol and 10 grams of freshly prepared (see Example I) cobalt-on-kieselguhr catalyst (15% cobalt content) was hydrogenated at 115° to 120° C. at an initial hydrogen pressure of 500–600 pounds per square inch until about 1.75 gram-mols of hydrogen had been absorbed. The reaction product was filtered from the catalyst and the methyl alcohol was removed by distillation. The residue was then stirred for two hours at room temperature with 150 cc. of a 30% aqueous solution of sodium bisulfite. 300 ml. of benzene were added and the aqueous phase was separated. The benzene layer was distilled to remove benzene.

Fractionation of the residue under reduced pressure resulted in, inter alia, a fraction (189 grams) boiling over the range of 90° to 93° C./3 mm. mercury. This was practically pure geraniol and had an index of refraction, $n_D^{20} = 1.472$.

Example V

A charge consisting of 228 grams of lemongrass oil, estimated by oximation to contain 75% of citral, 250 cc. of methyl alcohol and 10 grams of freshly prepared (see Example I) cobalt-on-kieselguhr catalyst (15% cobalt content) was hydrogenated at 125° C. to 135° C. under 400 to 500 pounds per square inch initial hydrogen pressure until an amount of hydrogen about 1.2 gram-mols of hydrogen had been absorbed. The reaction product was treated as in Example I.

A fraction (32 grams) having a boiling range of 40° to 70° C./3 mm. of mercury, consisting of terpenes and methyl heptenone present originally in the lemongrass oil was obtained as a forerun. A mid cut distilling over at 70° to 89° C. was also obtained, followed by 130 grams of geraniol as a fraction having a boiling range of 89° to 93° C./3 mm. and an index of refraction, $n_D^{22} = 1.4710$.

Example VI

A charge consisting of 393 grams of p-isopropyl alpha-methyl cinnamic aldehyde and 10 grams of freshly prepared (see Example I) cobalt-on-kieselguhr catalyst was hydrogenated in an autoclave at 135° C. to 140° C. and 750 pounds per square inch initial hydrogen pressure until approximately two gram-mols of hydrogen had been absorbed. This required about six hours.

The reaction product was filtered to separate the catalyst and then distilled under reduced pressure through an efficient fractionating column. The following fractions were obtained:

(1) 21 grams, 82°–101° C./2 mm.
(2) 302 grams, 111°–124° C./2 mm. $n_D^{25}=1.5432$.
(3) 40 grams, 130°–132° C./2 mm. $n_D^{25}=1.5496$.

Fractions 2 and 3 yielded no aldehyde-bisulfite addition compound when shaken with aqueous sodium bisulfite. On more careful fractionation the following fractions were separated.

(1) 35 grams, 95°–118° C./4 mm.
(2) 3 grams, 118°–129° C./4 mm.
(3) 78 grams, 129°–136° C./4 mm.
(4) 209 grams, 136°–142° C./4 mm. $n_D^{25}=1.5460$.

Fraction 4 was substantially pure p-isopropyl alpha-methyl cinnamic alcohol.

The foregoing illustrates the practice of this invention, which however, is not to be limited thereby but is to be construed as broadly as permissible in view of the prior art and limited solely by the appended claims.

I claim:

1. The process for preparing unsaturated alcohols comprising treating a material selected from the group consisting of citral, lemongrass oil, cinnamic aldehyde and p-isopropyl-alpha-methyl-cinnamic aldehyde with hydrogen in the presence of a supported reduced cobalt catalyst at a temperature between about 90° C. and about 160° C. under superatmospheric pressure until substantially one mol of hydrogen per mol of aldehyde present in the starting material has been absorbed.

2. The process of claim 1 wherein the catalyst is reduced cobalt-on-kieselguhr, the temperature employed is within the range of about 115° C. to about 140° C. and the pressure employed is within the range of about 200 to about 1000 pounds per square inch.

3. The process of claim 2 wherein the material treated is citral.

4. The process of claim 2 wherein the material treated is lemongrass oil.

5. The process of claim 2 wherein the material treated is cinnamic aldehyde.

WILLIAM JENNINGS PEPPEL.

REFERENCES CITED

The following references are of record in the file of this patent:

UNITED STATES PATENTS

| Number | Name | Date |
|---|---|---|
| 1,247,629 | Brochet | Nov. 27, 1917 |
| 2,098,206 | Hartung et al. | Nov. 2, 1937 |